United States Patent [19]

Davarian et al.

[11] Patent Number: 4,812,786
[45] Date of Patent: Mar. 14, 1989

[54] METHOD AND SYSTEM FOR PROVIDING PRECISE MULTI-FUNCTION MODULATION

[75] Inventors: Faramaz Davarian, Los Angeles; Joe T. Sumida, Altadena, both of Calif.

[73] Assignee: California Institute of Technology, Pasadena, Calif.

[21] Appl. No.: 100,991

[22] Filed: Sep. 28, 1987

[51] Int. Cl.$^4$ .................. H03C 5/00; H04L 27/12; H04L 27/20

[52] U.S. Cl. .................................. 332/16 R; 332/21; 332/23 R; 332/31 R

[58] Field of Search ................ 332/9 R, 16 R, 21, 22, 332/23 R, 31 R, 40, 41, 42; 375/39, 41, 44, 45, 52, 62, 67

[56] References Cited

U.S. PATENT DOCUMENTS

3,958,191 5/1976 Jones, Jr. ..................... 332/16 R X
4,584,540 4/1986 DuBose et al. .................. 332/9 R

*Primary Examiner*—Siegfried H. Grimm
*Attorney, Agent, or Firm*—William J. Benman, Jr.

[57] ABSTRACT

A method and system is disclosed which provides precise multi-function digitally implementable modulation for a communication system. The invention provides a modulation signal for a communication system in response to an input signal from a data source. A digitized time response is generated from samples of a time domain representation of a spectrum profile of a selected modulation scheme. The invention generates and stores coefficients for each input symbol in accordance with the selected modulation scheme. The output signal is provided by a plurality of samples, each sample being generated by summing the products of a predetermined number of the coefficients and a predetermined number of the samples of the digitized time response. In a specific illustrative implementation, the samples of the output signals are converted to analog signals, filtered and used to modulate a carrier in a conventional manner. The invention is versatile in that it allows for the storage of the digitized time responses and corresponding coefficient lookup table of a number of modulation schemes, any of which may then be selected for use in accordance with the teachings of the invention.

32 Claims, 5 Drawing Sheets

METHOD AND SYSTEM FOR PROVIDING PRECISE MULTI-FUNCTION MODULATION

ORIGIN OF THE INVENTION

The invention described herein was made in the performance of work under a NASA contract, and is subject to the provisions of Public Law 96-517 (35 U.S.C. 202) in which the Contractor has elected to retain title.

BACKGROUND OF THE INVENTION

The present invention relates to general purpose modulators for communication systems. More specifically, the present invention relates to accurate, versatile digitally implementable modulation schemes.

The current need for communications has lead to a congestion of the limited number of presently available telecommunication frequency bands. This has placed significant demands on the modern communication system in that it has to operate effectively in an increasingly crowded spectrum. The modern communication system has to operate within a narrow frequency band while rejecting interference from adjacent bands. As the ability of a communication system to operate effectively within such an environment is dependent, in no small measure on the efficacy of its modulation scheme, the current demands on such systems have necessitated the development of ever more sophisticated modulation techniques. In effect, the demanding nature of modern communications systems, of which satellite, microwave, and telephone line systems are typical, has made implementation precision a key issue in modern modem technology. Moreover, new applications such as aeronautical and land mobile satellite systems, require modulation schemes which exhibit both spectral and power efficiency. There is therefore a need in the art for a generalized implementation scheme that offers improved performance in precision and efficiency.

In addition, ease of construction and suitability for economical mass production are important considerations in the selection of a modulation technique for a given application. Analog realizations of such circuits typically lack the desired degree of precision and flexibility to meet the challenges of the current telecommunications market. For this reason, digital implementation techniques are steadily gaining popularity. Within this framework, there is a further need in the art for a digitally implementable system which provides a modulation scheme which may be quickly and easily changed to accommodate many of the currently used signaling techniques or upgraded to incorporate new introductions in modulation technology.

SUMMARY OF THE INVENTION

The need in the art is addressed by the present invention which provides precise multi-function digitally implementable modulation for a communication system. The invention provides a modulation signal for a communication system in response to an input signal from a data source. A digitized time response is generated from samples of a time domain representation of a spectrum profile of a selected modulation scheme. The invention generates and stores coefficients for each input symbol in accordance with the selected modulation scheme. The output signal is provided by a plurality of samples, each sample being generated by summing the products of a predetermined number of the coefficients and a predetermined number of the samples of the digitized time response. In a specific illustrative implementation, the samples of the output signals are converted to analog signals, filtered and used to modulate a carrier in a conventional manner. The invention is versatile in that it allows for the storage of the digitized time responses and corresponding coefficient lookup table of a number of modulation schemes, any of which may then be selected for use in accordance with the teachings of the invention.

DESCRIPTION OF THE INVENTION

As is known in the art a broad class of digital modulation techniques can be represented by equation [1] below:

$$C(t) = A(t)\cos w_c t + B(t)\sin w_c t \quad [1]$$

where C(t) denotes the resulting modulation at the carrier angular frequency $w_c$, and A(t) and B(t) denote two baseband information-bearing signals. The terms $A(t)\cos w_c t$ and $B(t)\sin w_c t$ represent the in-phase and quadrature components of the modulation signal C(t). Equation [1] can be used to represent several common modulation schemes such as frequency shift keying (FSK), binary phase shift keying (BPSK), quaternary phase shift keying (QPSK), M-ary phase shift keying (MPSK), quadrature amplitude modulation (QAM), etc. The waveforms A(t) and B(t) assume a different form for each modulation scheme.

The present invention provides a system and a technique for precisely generating many often used modulation schemes by implementing equation [1]. The technique of the present invention will be described with reference to an illustrative nonuniform 8-PSK modulation scheme. Nonetheless it will be understood by those skilled in the art that the present invention allows for the storage and use of other modulation schemes without significantly changing the system as discussed more fully below.

Figure 1:
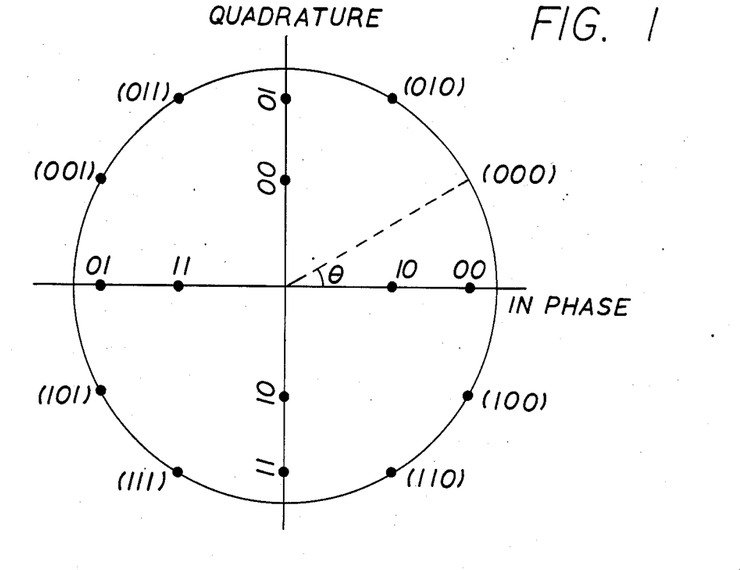
FIG. 1 shows a waveform constellation for a nonuniform 8-PSK signal.

FIG. 1 shows a waveform constellation for a nonuniform 8-PSK signal. The signal constellation can be viewed as a two dimensional structure. Each point on the constellation can be defined by a pair of coordinates on the X-Y axes. It is convenient to select a pair of orthogonal coordinate axes. If these axes are represented by $\cos w_c t$ and $\sin w_c t$, the coordinates are the functions A(t) and B(t) of equation [1]. For the signal constellation of FIG. 1, the coordinate functions A(t) and B(t) are quaternary waveforms assuming values proportional to $\pm\cos\theta$ and $\pm\sin\theta$, where $\theta$ is an angle which determines the constellation shape where $0 \leq \theta \leq \pi/2$. For the illustrative 8-PSK modulation scheme, the data signal is grouped three bits at a time to form a symbol. Each symbol assumes one of the eight known states or positions on the circle of the constellation in FIG. 1. The two most significant bits are used to define the X coordinate, A(t) and the two least significant bits are used to define the Y coordinate B(t). For example, the coordinates associated with the source output (000) are $A(t)=\cos\theta$ and $B(t)=\sin\theta$. Since the middle bit is shared between A(t) and B(t), these two waveforms are correlated. Table I below tabulates the potential values of A(t) and B(t) as in-phase and quadrature coefficients $a_i$ and $b_i$ respectively for each possible two-bit state. See equation [2].

TABLE I

Coordinate Functions of Nonuniform 8-PSK

| i | Two-Bit State | $a_i$ | $b_i$ |
|---|---|---|---|
| 1 | 00 | $\cos\theta$ | $\sin\theta$ |
| 2 | 01 | $-\cos\theta$ | $\cos\theta$ |
| 3 | 10 | $\sin\theta$ | $-\sin\theta$ |
| 4 | 11 | $-\sin\theta$ | $-\cos\theta$ |

Signaling pulse shape influences the carrier spectrum. Pulse shaping is achieved by filtering. Although, in general, the waveforms A(t) and B(t) are correlated, they can be filtered separately. Letting h(t) denote the pulse shape, waveforms A(t) and B(t) can be formulated as:

$$A(t) = \sum_i a_i h(t - iT) \quad [2]$$

and $$B(t) = \sum_i b_i h(t - iT)$$

where $$\sum_i$$

represents a summation over the symbol count index i, $a_i$ and $b_i$ depend on the source output at time iT from Table I, and T represents the symbol duration. For the illustrative 8-PSK implementation of the present invention, the symbol duration T is three times the source bit duration.

As discussed below with respect to the illustrative implementation of the invention, the information-bearing signals A(t) and B(t) are sampled and may be represented by equation [3] below:

$$A(nt + js) = \sum_i a_i h[js + (n - i)T] \quad [3]$$

and $$B(nt + js) = \sum_i b_i h[js + (n - i)T]$$

where s represents the sampling period, j is an integer pointing to the sample position within a symbol duration, and n is the symbol count. Assuming L samples per symbol are taken, j ranges from 1 to L. The symbol duration T is equal to the number of samples per symbol L times the sampling period s.

In the absence of band limitation, h(t) is confined to a symbol time, hence avoiding intersymbol interference (ISI). In the presence of band limitation, at any instant of time, A(t) and B(t) are affected by more than one symbol. Since A(t) and B(t) are band limited in practice, they may be sampled using an adequate sampling rate. The present invention takes advantage of this principle.

In practice intersymbol interference is limited to a finite number of symbols. As will be appreciated by those skilled in the art, the digitized information-bearing signals of equation [3] are time limited to a length in terms of symbols that is commensurate with the ISI. Accordingly, letting 2M denote the ISI length in terms of symbols, A(t) and B(t) of equation [3] become:

$$A(nt + js) = \sum_k a_{-k+n} h[js + kT] \quad [4a]$$

and $$B(nt + js) = \sum_k b_{-k+n} h[js + kT] \quad [4b]$$

where k ranges from $-M$ to $M-1$. Equations 4(a) and 4(b) indicate that each sample of A(t) and each sample of B(t) result from 2M multiplications. Since L samples are required per symbol, 2ML multiplications are required per symbol to generate A(t) and 2ML multiplications are required per symbol to generate B(t). Hence, the total number of multiplications per symbol per second required to generate samples of both A(t) and B(t) is 4ML/T. Parameters M, L, and the quantization resolution must be selected such that distortions resulting from truncation, sampling, and quantization remain small. See Design of Quadrature Modulator for Digital FM Signaling with Digital Signal Processing", *Trans. IECE of Japan*, vol. J65-B, no. 9, pp. 1148–1155, Sept. 1982.

Figure 2:
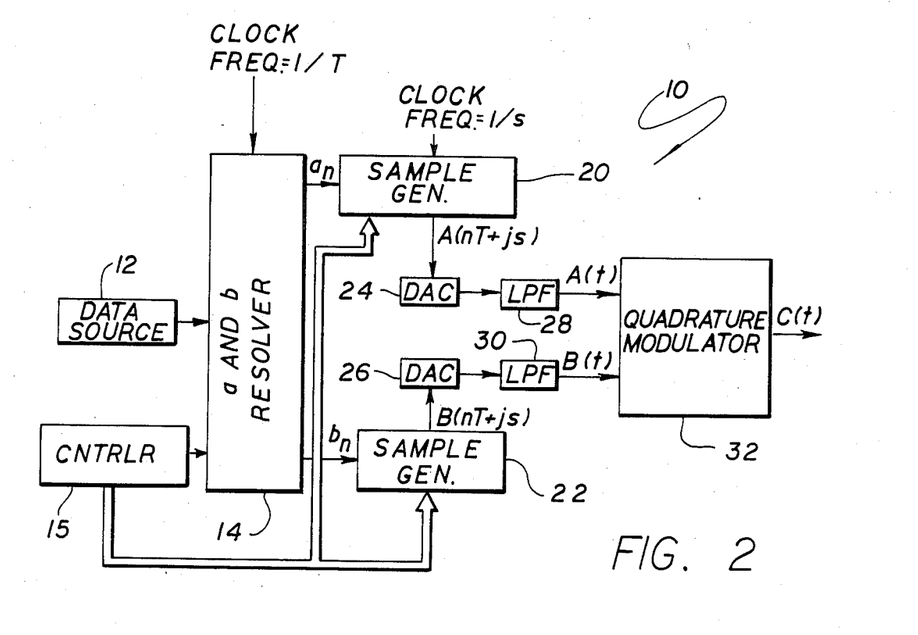
FIG. 2 shows a block diagram of an illustrative implementation of a modulator constructed in accordance with the teachings of the present invention.
Figure 3:
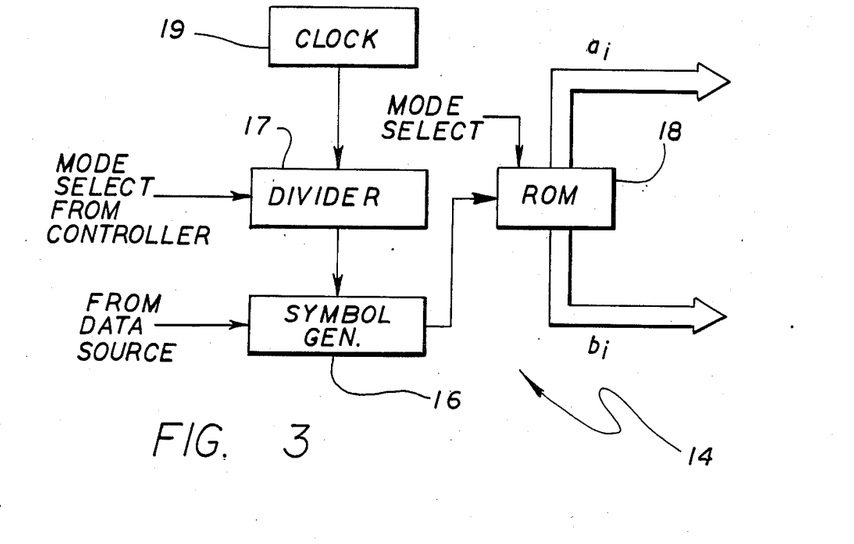
FIG. 3 is a simplified illustrative implementation of the coefficient resolver utilized in the modulator of the present invention.

An illustrative implementation of a modulator 10 constructed in accordance with the teachings of the present invention is shown in FIG. 2. Digital input information is provided to the modulator 10 by a conventional data source 12. The input data is translated into coefficients by a resolver 14. As illustrated in FIG. 3, the resolver 14 may be implemented by a symbol generator 16 and a lookup table stored in a read-only-memory ROM (or programmable read-only-memory) 18. The symbol generator 16 groups bits of input data into symbols in accordance with a modulation scheme selected as discussed below. The symbol size is provided by the controller 15 via a mode select input to a divider circuit 17. (The controller 15 may be a computer, microprocessor or control panel switch.) The divider circuit 17 provides an output every x clock pulses which signals the symbol generator 16 to group the last x bits into a single symbol. Note that the 'mode select' is used by the ROM 18 to provide the coefficients $a_i$ and $b_i$ based on the symbol generated. As mentioned above, coefficients corresponding to a plurality of modulation schemes may be stored in the ROM 18 for selection by the controller via the 'mode select' signal. It will also be appreciated by those skilled in the art that though not necessarily specified herein, appropriate timing circuitry (clocks) will be required for proper operation of the modulator 10.

As mentioned above, each input symbol is represented by a pair of the coefficients $a_i$ and $b_i$ which are chosen in accordance with a selected modulation scheme. The resolver 14 is clocked at 1/T, where T is the symbol time, and provides the coefficients $a_i$ and $b_i$ for first and second identical sample generators 20 and 22. As discussed below, the first and second sample generators 20 and 22 output baseband information-bearing signals A(t) and B(t) to digital-to-analog converters (DACs) 24 and 26 respectively. The analog signals A(t) and B(t) are smoothed by low pass filters 28 and 30 and used to modulate a carrier signal $w_c$ by a conventional quadrature modulator 32.

Figure 4A:
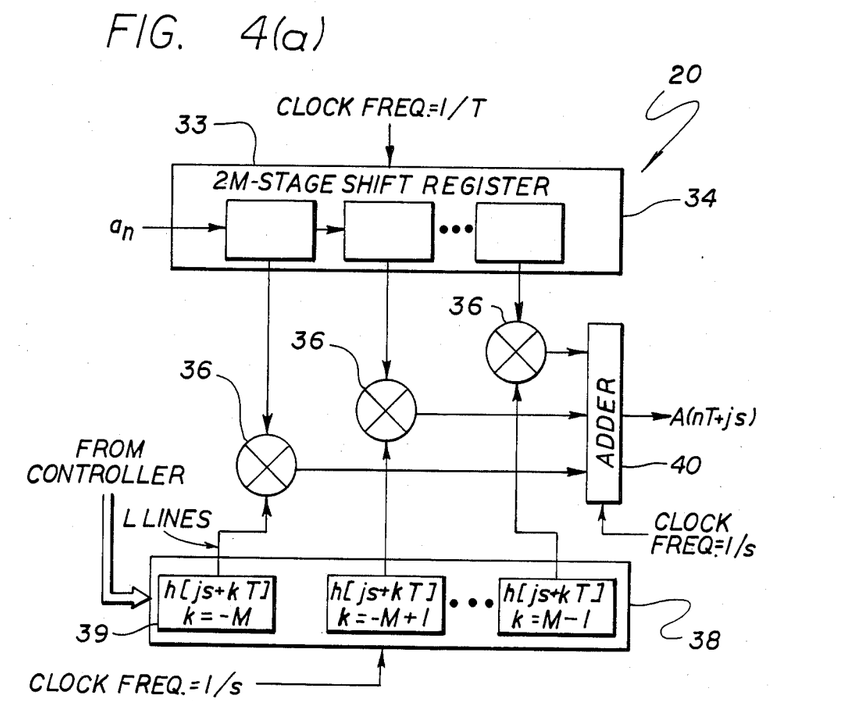
FIG. 4(a) is an illustrative parallel implementation of the sample generator utilized in the modulator of the present invention.
Figure 4B:
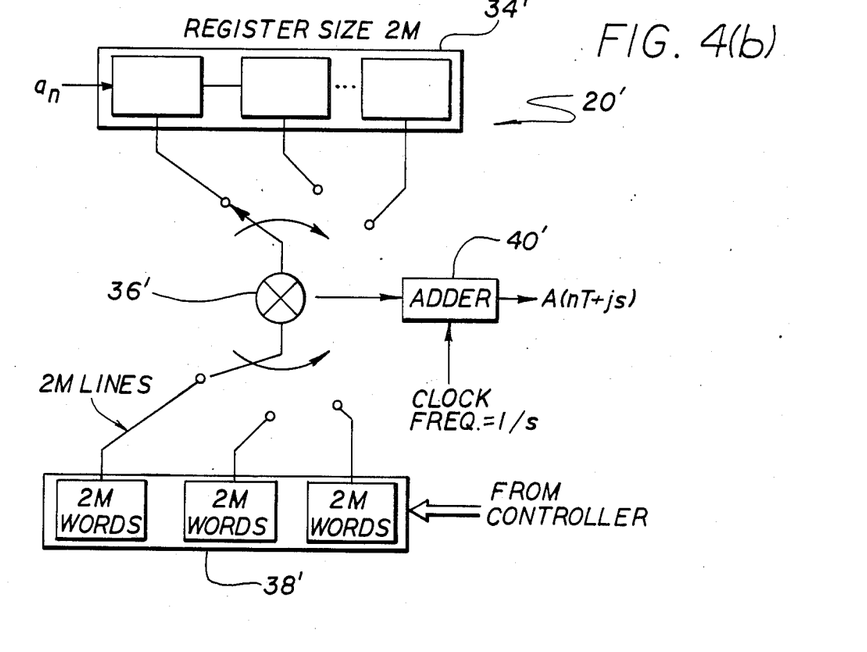
FIG. 4(b) is an alternative serial implementation of the sample generator which may be utilized in the modulator of the present invention.

FIGS. 4(a) and 4(b) show alternative illustrative embodiments 20 and 20', of the sample generators 20 and 22. The sample generators 20 and 22 receive and store the coefficients $a_i$ and $b_i$ respectively from the resolver 14 and perform the multiplications and additions required to generate a(nt+js) and b(nt+js) respectively.

FIG. 4(a) shows a parallel implementation of the sample generator 20 which includes a shift register 34 having 2M stages. The first stage 33 of the shift register 34 receives the $a_i$ or the $b_i$ coefficient from the resolver 14 and provides it to a corresponding multiplier 36 of which 2M are provided. The digitized values of system time response in accordance with the selected modulation scheme are stored in a second memory 38 having 2M blocks 39 each of sufficient storage capacity to store L words each. A number of digitized time responses may be stored in the memory 38 for selection by the controller 15 or by other suitable means known in the art. The memory 38 is clocked at a frequency of 1/s. The M blocks of the memory 38 are each connected to a corresponding multiplier 36 through a bus of L lines.

In the steady state and in accordance with the method described above, particularly equations 4(a) and 4(b), a coefficient $a_i$ is stored in each of the 2M stages 33 of the shift register 34. The corresponding multiplier 36 multiplies each coefficient $a_i$ by a corresponding sample of h(t) represented by one of the L words stored in each of the blocks 39 of the memory 38 to provide a corresponding product. See equation 4(a). Since the symbol range is 2M, there will be 2M products. The 2M products are summed by the adder 40 to provide one sample of the information-bearing signal A(t) or B(t). The next sample of A(t) will be generated by incrementing the sample index j by clocking the memory 38 to provide a new set of samples to be multiplied against the coefficients to provide a second sample for the information-bearing signal corresponding to the first input symbol. The process is continued until the sample index j equals L resulting in 2ML multiplications and L samples of the output signal for each input symbol. (Note that the multiplier 36, the memory 38 and the adder 40 are clocked at a frequency equal to 1/s while the register 34 is clocked at 1/T.) At this point, the system 10 looks at the next input symbol by shifting a new coefficient into the register 34 causing the first coefficient to drop out. This process is repeated until the input symbols have been shifted through the register 34. That is, with respect to equation 4(a), the process continues as k ranges from $-M$ to $M-1$ (corresponding to the multiplication of the samples stored in the 2M blocks of the memory 38 by the corresponding coefficient stored in the 2M stages of the shift register 34), as j ranges from 1 to L (corresponding to the selection of individual words within a block of the memory 38), and as n ranges from 0 to $n_{max}$ (corresponding to each of the symbols of input data) until the modulation signal C(t) is complete. See equations 4(a) and 4(b) above.

FIG. 4(b) shows the sample generator 20' in a serial implementation. The design of the second embodiment of the sample generator 20' is essentially identical to that of the first embodiment 20 with the exception that a single multiplier 36' is employed. Switches (with associated control), not shown, present the samples of the time domain representation of the transfer function via one of 2M lines to the multiplier 36' for multiplication and addition in manner discussed above. Note that the stored data in the memory blocks have been rearranged and that there are now L blocks (instead of 2M) with each block containing 2M samples. Again, since the ISI length is 2M and the pulse shape h(t) is presented by L samples per symbol, the total number of samples is 2ML. Let the samples of h(t) be denoted by $h_i$ where i ranges from 1 to 2ML. In the embodiment of FIG. 4(b), data are stored in the memories every other L samples as follows. The first block contains samples for $i=1$, $L+1$, $2L+1$, ..., $(2M-1)L+1$. The second block contains samples for $i=2$, $L+2$, ..., $(2M-1)L+2$. The last block contains samples for $i=L$, $2L$, ..., $2ML$. The values stored temporarily in the shift register 34' are multiplied by the content of the first memory block of the memory 38' serially in a time-shared fashion and added in the adder 40' to provide a sample of A(t). Next, the cycle repeats for second block of the memory 38'. This continues until the contents of all the blocks have been accessed. At this point, a new value enters the shift register 34', pushing the content of the registers one stage to the right and dropping off the oldest datum. Then the previously noted cycles repeat. The multiplication rate in this embodiment is 2ML/T multiplications per second.

With either implementation, i.e. that of FIG. 4(a) of FIG. 4(b), the second sample generator 22 is simultaneously generating, in the same manner, corresponding values of the second information-bearing signal B(t). The information-bearing signals A(t) and B(t) are converted to analog signals by digital to analog converters (DACs) 24 and 26 respectively. See FIG. 2. The analog forms of A(t) and B(t) are smoothed by low pass filters 28 and 30 respectively and input to a quadrature modulator 32. The quadrature modulator 32 uses the filtered analog signals to modulate a carrier signal $w_c$ in a manner known to those skilled in the art.

The modulator of the present invention is very versatile. The pulse shape of the transfer function h(t) or the spectral shape of the carrier can be changed by simply changing the contents of the memory blocks. Similarly, any source bit rate can be accommodated by simply changing the master clock rate. Simple modifications of the memory blocks in the sample generator and the coefficient resolver of FIG. 2 could result in a different modulation scheme. For example, this modulator can change from an FM system to a SSB-AM system by the flip of a switch.

Figure 5:
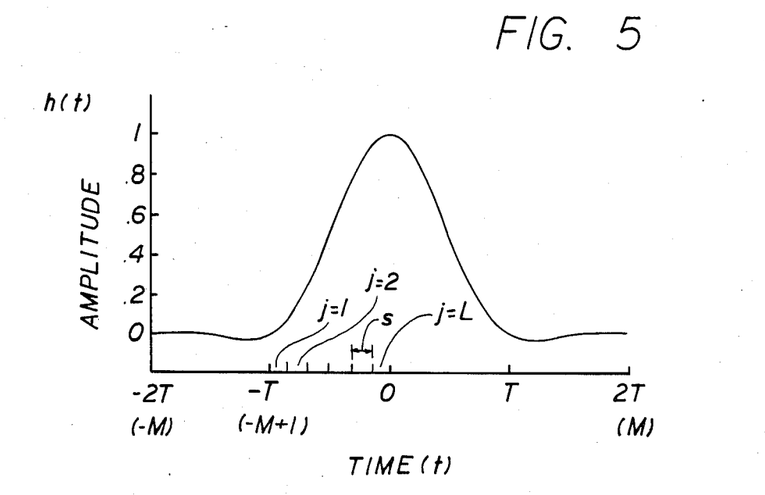
FIG. 5 shows a system time response representative of h(t) for a raised cosine 8-PSK modulation scheme.
Figure 6:
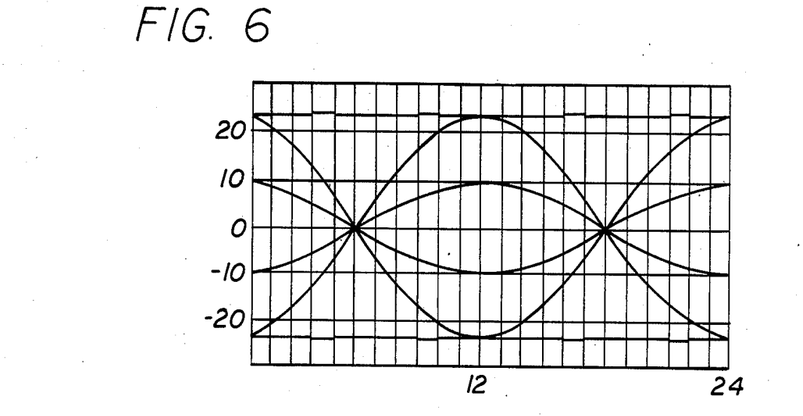
FIG. 6 shows the eye diagram for a raised cosine 8-PSK signal at the output of a filter of the modulator of the present invention.
Figure 7:
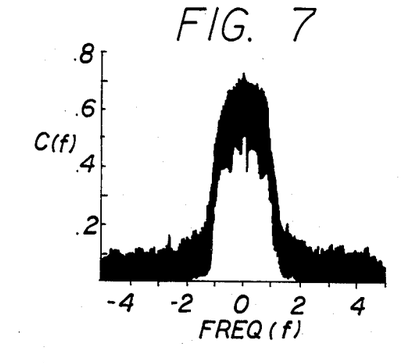
FIG. 7 shows an illustrative spectrum profile of a modulated output signal using a raised cosine 8-PSK modulation scheme.
Figure 8:
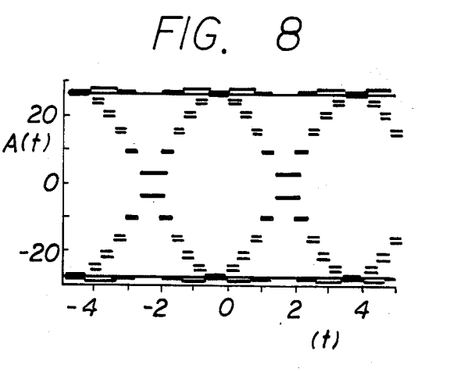
FIG. 8 shows the eye diagram of the output of the DAC of the modulator of the present invention with a raised cosine QPSK modulation scheme.
Figure 9:
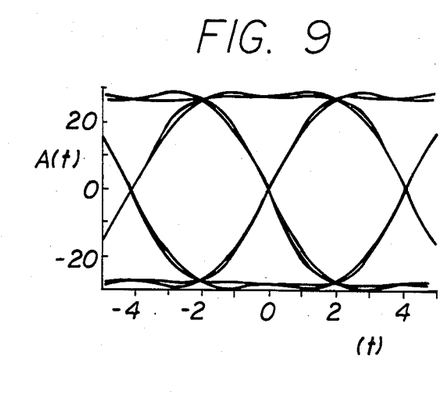
FIG. 9 shows the eye diagram of the filter output corresponding to a raised cosine QPSK modulation scheme.
Figure 10:
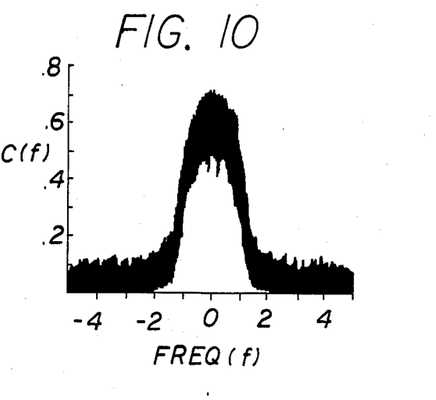
FIG. 10 shows the spectrum profile of a modulated output signal using a raised cosine QPSK modulation scheme.

FIG. 5 shows a system time response representative of h(t) for a raised cosine 8-PSK modulation scheme. FIG. 6 shows the eye diagram for a raised cosine 8-PSK signal at the output of a filter of the modulator of the present invention. FIG. 7 shows an illustrative spectrum profile of a modulated output signal using a raised cosine 8-PSK modulation scheme. FIG. 8 shows the eye diagram of the output of the DAC of the modulator of the present invention with a raised cosine QPSK modulation scheme. FIG. 9 shows the eye diagram of the filter output corresponding to a raised cosine QPSK modulation scheme. FIG. 10 shows the spectrum profile of a modulated output signal using a raised cosine QPSK modulation scheme.

The present invention has been described above with reference to an illustrative embodiment and a particular application. Those of ordinary skill in the art, having access to the teachings provided herein will recognize additional modifications, applications and embodiments within the scope thereof. For example, the invention is not limited to the technique by which the input signal is digitized to provide the sample coefficients. Nor is the invention limited to the technique by which the sample generators are implemented.

Figures 11, 12:
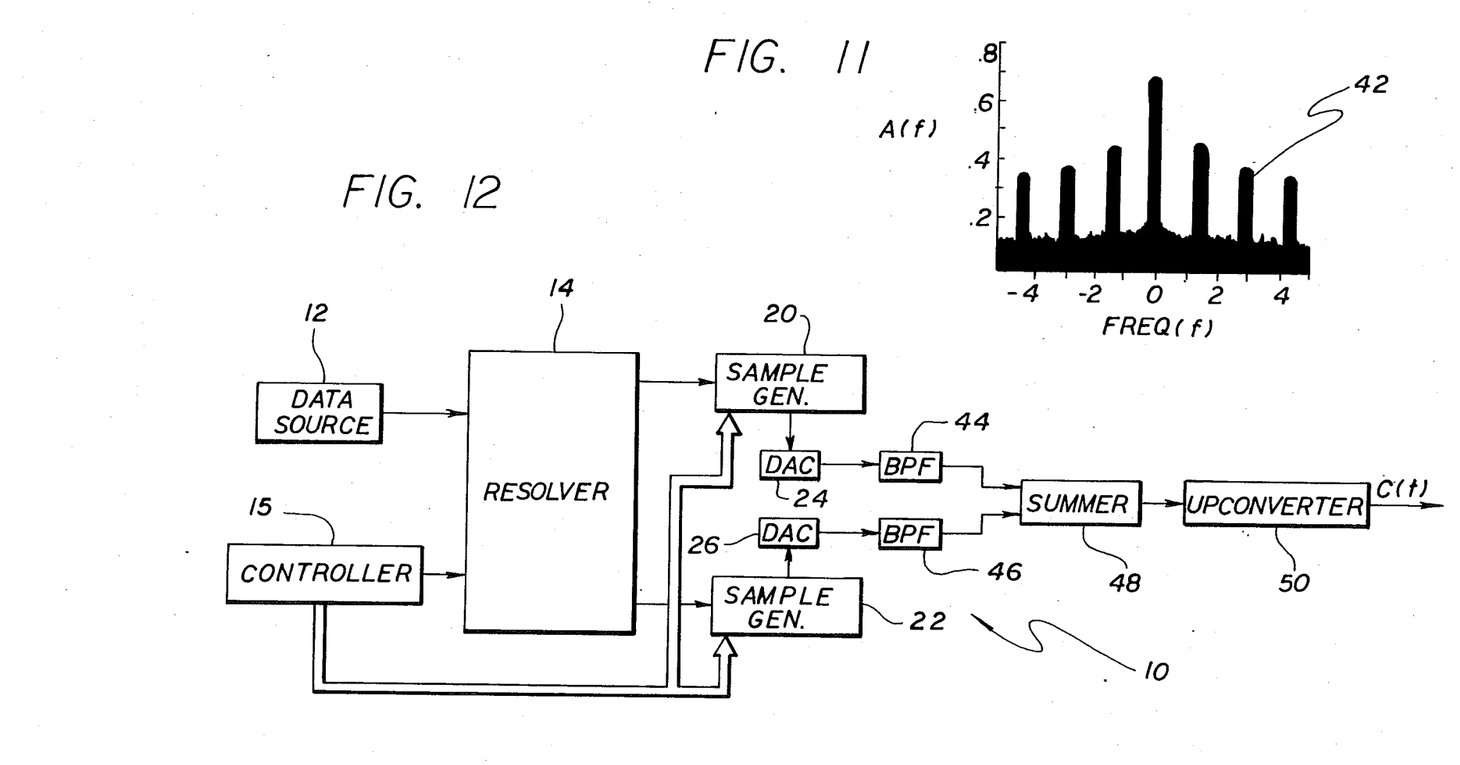
FIG. 11 shows a representative signal spectrum of A(t) at the output of a digital-to-analog converter of the present invention.
FIG. 12 shows an alternative embodiment of a modulator constructed in accordance with the teachings of the present invention.

Further, the invention is not limited to the use of a quadrature modulator. It will be appreciated by those skilled in the art, that the quadrature modulator 32 may be eliminated and replaced by a summer (or coupler) if the two lowpass filters are replaced by two bandpass filters centered at one of the spectral harmonics. The harmonics exist at the output of the DACs at multiples of L times the symbol rate, i.e., at multiples of L/T. FIG. 11 is an illustrative representation of a signal spectrum of A(t) at the output of the DAC 24 showing a number of harmonics e.g. 42. FIG. 12 shows a modulator 10 constructed in accordance with the above disclosed teachings of the present invention with the exception that the low pass filters 28 and 30 and the quadrature modulator 32 of FIG. 1 have been replaced with bandpass filters 44 and 46, a summer 48 and an upconverter 50. The bandpass filters 44 and 46 are centered at one of the spectral harmonics (e.g. 42 of FIG. 11) of the DAC outputs. The selected harmonic from each channel is summed and upconverted to the desired frequency by the summer 48 and the upconverter 50 respectively. Those skilled in the art will appreciate that this scheme would require that h(t), for the quadrature channel providing B(t), be delayed by s/4m, where m denotes the order of the harmonic. Thus, h(t) for the quad channel would become h(t+s/4m).

It is intended by the appended Claims to cover any and all such modifications, applications and embodiments within the scope of the present invention. Accordingly,

What is claimed is:

1. A method for providing a modulation signal for a communication system in response to an input signal from a data source, said method including the steps of:
   providing a digitized time response from samples of time domain representation of a spectrum profile of a selected modulation scheme;
   generating and storing a coefficient for each input symbol in accordance with said selected modulation scheme; and
   generating samples of an output signal, each sample being generated by:
   multiplying a predetermined number of said coefficients by a predetermined number of samples of said digitized time response to provide a number of products; and
   summing said products to provide one of said samples of said output signal.

2. The method of claim 1 including the step of utilizing said samples to modulate a carrier signal.

3. The method of claim 1 including the step of converting said samples to corresponding analog signals.

4. The method of claim 3 including the step of filtering said analog signals.

5. The method of claim 4 including the step of modulating a carrier signal with said filtered analog signals.

6. The method of claim 1 wherein said step of providing a digitized time response from samples of a time domain representation of a spectrum profile of a selected modulation scheme includes the steps of:
   storing a plurality of digitized time responses from samples of time domain representations of a plurality of spectrum profiles corresponding to a plurality of modulation schemes and
   selecting one of said modulation schemes.

7. A method for providing a modulation signal of the form $C(t) = A(t)\cos w_c t + B(t)\sin w_c t$, where C(t) denotes the resulting modulation at the carrier angular frequency $w_c$, and A(t) and B(t) denote baseband information-bearing signals, and $A(t)\cos w_c t$ and $B(t)\sin w_c t$ represent in-phase and quadrature components of the modulation signal C(t) respectively, for a communication system in response to an input signal from a data source, said method including the steps of:
   generating and storing a set of in-phase and quadrature coefficients $a_i$ and $b_i$ respectively for the ith input symbol in accordance with a selected modulation scheme;
   providing a digitized time response of the form $h[js+kT]$, where j is the sample index within a symbol, k is the symbol count index, s is the sampling period and T is the symbol duration, from samples of a time domain representation of a spectrum profile of said selected modulation scheme;
   choosing a symbol range 2M;
   taking L samples per symbol of the digitized time response h(t) over said range of 2M symbols to provide 2ML samples; and
   generating L samples of the information-bearing signals A(t) and B(t), each jth sample being generated by:
   multiplying 2M in-phase coefficients $a_i$ and 2M quadrature coefficients $b_i$ by 2M samples of said digitized time response h(t) to provide 2M products for each of the signals A(t) and B(t) respectively; and
   summing said 2M products for each jth sample to provide one of the L samples of each signal A(t) and B(t) for each input symbol n;
   whereby the information-bearing signals take the form:

$$A(nt + js) = \sum_k a_{-k+n} h[js + kT]$$

and $$B(nt + js) = \sum_k b_{-k+n} h[js + kT].$$

where n is the symbol number, j ranges over the sample range L and k ranges over the symbol range 2M.

8. The method of claim 7 including the step of utilizing said L samples to modulate a carrier signal.

9. The method of claim 7 including the step of converting said L samples to corresponding in-phase and quadrature information-bearing analog signals A(t) and B(t) respectively.

10. The method of claim 9 including the step of filtering said in-phase and quadrature information-bearing analog signals A(t) and B(t).

11. The method of claim 10 including the step of modulating a carrier signal with said filtered information-bearing analog signals A(t) and B(t) to provide said modulation signal C(t).

12. The method of claim 7 wherein said step of providing a digitized time response from samples of a time domain representation of a spectrum profile of said selected modulation scheme includes the steps of;
    storing a plurality of digitized time responses from samples of time domain representations of a plurality of spectrum profiles corresponding to a plurality of modulation schemes and
    selecting one said modulation schemes.

13. A modulator for providing a modulation signal for a communication system in response to an input signal from a data source, said modulator comprising:
    means for providing a digitized time response from samples of a time domain representation of a spectrum profile of a selected modulation scheme;
    means for generating and storing a coefficient for each input symbol in accordance with said selected modulation scheme; and
    means for generating samples of an output signal, including means for generating each sample by:
    multiplying a predetermined number of said coefficients by a predetermined number of samples of said digitized time response to provide a number of products; and
    summing said products to provide one of said samples of said output signal.

14. The modulator of claim 13 including means for utilizing said samples to modulate a carrier signal.

15. The modulator of claim 13 including means for converting said samples to corresponding analog signals.

16. The modulator of claim 15 including means for filtering said analog signals.

17. The modulator of claim 16 including means for modulating a carrier signal with said filtered analog signals.

18. The modulator of claim 17 wherein said means for providing a digitized time response from samples of a time domain representation of a spectrum profile of a selected modulation scheme includes:
    means for storing a plurality of digitized time responses from samples of time domain representations of a plurality of spectrum profiles corresponding to a plurality of modulation schemes and
    means for selecting one of said modulation schemes.

19. A modulator for providing a modulation signal of the form $C(t) = A(t)\cos w_c t + B(t)\sin w_c t$, where C(t) denotes the resulting modulation at the carrier angular frequency $w_c$, and A(t) and B(t) denote first and second baseband information-bearing signals respectively, and $A(t)\cos w_c t$ and $B(t)\sin w_c t$ represent in-phase and quadrature components of the modulation signal C(t) respectively, for a communication system in response to an input signal from a data source, said modulator including:
    means for generating and storing a set of in-phase and quadrature coefficients $a_i$ and $b_i$ respectively for the ith input symbol in accordance with a selected modulation scheme;
    means for providing a digitized time response of the form $h[js+kT]$, where j is the sample index within a symbol, k is the symbol count index, s is the sampling period and T is the symbol duration, from samples of a time domain representation of a spectrum profile of said selected modulation scheme;
    means for choosing a symbol range 2M;
    means for taking L samples per symbol of the digitized time response h(t) over said range of 2M symbols to provide 2ML samples; and
    means for generating L samples of the information-bearing signals A(t) and B(t), including means for generating each jth sample by:
    multiplying 2M in-phase coefficients $a_i$ and 2M quadrature coefficients $b_i$ by 2M samples of said digitized time response h(t) to provide 2M products for each of the signals A(t) and B(t) respectively; and
    summing said 2M products for each jth sample to provide one of the L samples of each signal A(t) and B(t) for each input symbol n;
    whereby the information-bearing signals take the form:

$$A(nt + js) = \sum_k a_{-k+n} h[js + kT]$$

and $$B(nt + js) = \sum_k b_{-k+n} h[js + kT].$$

where n is the symbol number, j ranges over the sample range L and k ranges over the symbol range 2M.

20. The modulator of claim 19 wherein said means for providing a digitized time response from samples of a time domain representation of a spectrum profile of said selected modulation scheme includes:
    means for storing a plurality of digitized time responses from samples of time domain representations of a plurality of spectrum profiles corresponding to a plurality of modulation schemes and
    means for selecting one of said modulation schemes.

21. The modulator of claim 20 including means for utilizing said samples to modulate a carrier signal.

22. The modulator of claim 21 including means for converting said samples to corresponding analog signals.

23. The modulator of claim 22 including means for filtering said analog signals.

24. The modulator of claim 23 including means for modulating a carrier signal with said filtered analog signals.

25. A multi-function modulator for providing a modulation signal of the form C(t) $A(t)\cos w_c t + B(t)\sin w_c t$, where C(t) denotes the resulting modulation at the carrier angular frequency wc, and A(t) and B(t) denote baseband information-bearing signals, and $A(t)\cos w_c t$ and $B(t)\sin w_c t$ represent in-phase and quadrature components of the modulation signal C(t) respectively, for a communication system in response to an input signal from a data source, said modulator including:
    means for generating and storing a set of in-phase and quadrature coefficients $a_i$ and $b_i$ respectively for the ith input symbol in accordance with a selected modulation scheme;

means for providing a digitized time response of the form h[js+kT], where j is the sample index within a symbol, k is the symbol count index, s is the sampling period and T is the symbol duration, from samples of a time domain representation of a spectrum profile of a plurality of modulation schemes including said selected modulation scheme;

means for choosing a symbol range 2M;

means for taking L samples per symbol of the digitized time response h(t) over said range of 2M symbols to provide 2ML samples;

means for generating L samples of the information-bearing signals A(t) and B(t), including means for generating each jth sample by:

multiplying 2M in-phase coefficients $a_i$ and 2M quadrature coefficients $b_i$ by 2M samples of said digitized time response h(t) to provide 2M products for each of the signals A(t) and B(t) respectively; and summing said 2M products for each jth sample to provide one of the L samples of each signal A(t) and B(t) for each input symbol n;

whereby the information-bearing signals take the form:

$$A(nt + js) = \sum_k a_{-k+n} h[js + kT]$$

and $$B(nt + js) = \sum_k b_{-k+n} h[js + kT].$$

where n is the symbol number, j ranges over the sample range L and k ranges over the symbol range 2M; and means for utilizing said samples to modulate a carrier signal.

26. The method of claim 4 including the step of providing a carrier signal modulated with said filtered analog signals by selecting a harmonic of said analog signals.

27. The method of claim 10 including the step of providing a carrier signal modulated with said filtered analog signals by selecting a harmonic of said analog signals.

28. The modulator of claim 15 including means for providing a carrier signal modulated with said analog signals, said means for providing a carrier signal modulated with said analog signal further including means for selecting a harmonic of said analog signals.

29. The modulator of claim 22 including means for providing a carrier signal modulated with said analog signals, said means for providing a carrier signal modulated with said analog signal further including means for selecting a harmonic of said analog signals.

30. The modulator of claim 29 wherein said means for modulating said carrier signal includes first and second bandpass filter means for selecting said harmonic from the outputs of said first and second information-bearing signals A(t) and B(t) respectively.

31. The modulator of claim 30 further including means for summing the outputs of said first and second bandpass filters.

32. The modulator of claim 31 further including up-converter means for upconverting the output of said summing means to provide said modulated signal C(t).

* * * * *